(12) United States Patent
Wang et al.

(10) Patent No.: US 10,077,350 B2
(45) Date of Patent: *Sep. 18, 2018

(54) PROCESS FOR DEVULCANIZING RUBBER

(71) Applicant: FIRESTONE BUILDING PRODUCTS CO., LLC, Indianapolis, IN (US)

(72) Inventors: Hao Wang, Carmel, IN (US); Michael J. Hubbard, Anderson, IN (US)

(73) Assignee: Firestone Building Products Co., LLC, Indianapolis, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/392,031

(22) Filed: Dec. 28, 2016

(65) Prior Publication Data

US 2017/0107347 A1 Apr. 20, 2017

Related U.S. Application Data

(63) Continuation of application No. 14/038,954, filed on Sep. 27, 2013, now Pat. No. 9,556,319.

(60) Provisional application No. 61/707,218, filed on Sep. 28, 2012.

(51) Int. Cl.

| C08J 11/10 | (2006.01) |
|---|---|
| B29B 17/04 | (2006.01) |
| C08J 11/12 | (2006.01) |
| B29K 23/00 | (2006.01) |
| B29L 31/10 | (2006.01) |
| B29L 7/00 | (2006.01) |

(52) U.S. Cl.
CPC ............. *C08J 11/10* (2013.01); *B29B 17/04* (2013.01); *C08J 11/12* (2013.01); *B29B 2017/042* (2013.01); *B29K 2023/16* (2013.01); *B29L 2007/005* (2013.01); *B29L 2031/108* (2013.01); *C08J 2323/16* (2013.01)

(58) Field of Classification Search
CPC ........ C08J 11/10; C08J 11/12; C08J 2323/16; B29B 17/04; B29B 2017/042; B29L 2007/005; B29L 2031/108; B29K 2023/16
See application file for complete search history.

(56) References Cited

U.S. PATENT DOCUMENTS

| 2,461,192 | A | 2/1949 | Banbury et al. |
|---|---|---|---|
| 3,280,082 | A | 10/1966 | Natta et al. |
| 5,770,632 | A | 6/1998 | Sekhar et al. |
| 5,821,395 | A | 10/1998 | Price et al. |
| 6,632,918 | B1 | 10/2003 | Matsushita |
| 6,956,065 | B2 | 10/2005 | Van Duin |
| 7,342,052 | B2 | 3/2008 | Fulford |
| 2011/0171114 | A1* | 7/2011 | Shaw ............... C08J 11/12 423/566.1 |
| 2013/0023639 | A1 | 1/2013 | Rust |

* cited by examiner

*Primary Examiner* — Frances Tischler
(74) *Attorney, Agent, or Firm* — Brian D. McAlhaney; Arthur M. Reginelli

(57) ABSTRACT

A process for devulcanizing EPDM rubber comprising the step of introducing sulfur-cured EPDM to an extruder, introducing from about 0.5 to about 20 wt % scavenging agent, based upon the total weight of the EPDM and scavenging agent, and mixing and masticating the EPDM at a temperature sufficient to at least partially devulcanize the sulfur-cured EPDM.

6 Claims, 1 Drawing Sheet

PROCESS FOR DEVULCANIZING RUBBER

This application is a continuation application of U.S. Non-Provisional application Ser. No. 14/038,954 filed on Sep. 27, 2013, which claims the benefit of U.S. Provisional Application Ser. No. 61/707,218, filed on Sep. 28, 2013, which are incorporated herein by reference.

FIELD OF THE INVENTION

Embodiments of invention relate to devulcanizing sulfur-cured rubber by thermo-mechanical techniques while removing or scavenging sulfur and sulfur-bearing species that are a by-product of the devulcanization process.

BACKGROUND OF THE INVENTION

Rubber membranes are used in a variety of applications. For example, it is common in the art to employ rubber sheet material to cover rooftops, especially flat or low-sloped roofs. One type of technologically useful membrane is prepared from olefinic rubber such as EPDM rubber, which is a terpolymer of ethylene, propylene and a diene monomer. A curative is employed to crosslink the EPDM terpolymer and thereby create a durable protective membrane. Sulfur curatives are often used to cure or crosslink the rubber. Advantageously, EPDM has a fully saturated backbone, which provides resistance to ozone and oxidation.

These protective membranes must be able to withstand severe environmental conditions without the membrane failing. Depending on the geographic location, the EPDM terpolymer membranes must be able to withstand temperatures that can reach up to as high as about 90° C. for prolonged periods of time. Further, these membranes must be able to withstand long exposure to UV light and ozone without undergoing chemical degradation. Further, these membranes must withstand mechanical stresses that are experienced, as least in part, from wind uplift forces. As is known in the art, useful EPDM membranes must meet the performance standards set forth in ASTM D 4637-03 and D1418-85.

While technologically useful, these membranes have a limited life. In many situations, the service life does not exceed thirty years. Replacement of roofing membrane may include placement of new membrane over the existing membrane, or removal of the existing membrane followed by installation of the new membrane. The latter is often desirable or required.

Removal of an existing membrane creates a disposal issue. Thousands, if not millions, of square feet of EPDM-based membranes are used to cover roofs, and therefore disposal of existing membranes is not trivial. Solutions to the problem that have been proposed include recycling of the scrap EPDM for use in other applications such as fuel or as filler in new rubber products.

Entities in many industries seek to recycle EPDM rubber in order to reduce waste and increase profits by putting scrap rubber to beneficial use. In mechanical processes, EPDM rubber is recycled simply by physically cutting and grinding the same into small pieces that can be incorporated into new rubber products, essentially as filler. The particle size of the ground rubber may vary depending on the grinding methods employed. Large particles of ground rubber, which are typically used as fuel, are obtained with regular shredders or grinders, while fine rubber particles are obtained by cryogenic grinding and used as fine fillers in rubber and plastic products. Mechanically recycled rubbers are typically employed in applications where the mechanical and physical properties of the end product are not too demanding. Few waste rubber products can be mechanically recycled for use in their original applications. For example, while others have mechanically recycled scrap EPDM roofing membranes, this recycled rubber is not used in new roofing membranes because the small pieces of recycled rubber are still vulcanized and thus not able to successfully interact with the remainder of the rubber matrix of the new roofing membrane.

In order to process the ground rubber particles and form them into useful products, they are typically mixed with virgin polymers. Although ground rubber may be incorporated into virgin rubber in this manner, the ground rubber remains phase separated from the virgin material and therefore may not become incorporated into the rubber matrix upon curing of the virgin rubber.

In light of this, efforts have been made to devulcanize rubber products, including EPDM. Chemical devulcanization is an example that is particularly distinguishable from the non-devulcanizing mechanical cutting and grinding method previously stated above. U.S. Pat. No. 6,956,065 teaches the use of amines as devulcanizing agents to devulcanize EPDM rubber. U.S. Pat. No. 5,770,632 also discloses a chemical devulcanization process.

Yet another devulcanization method involves a thermo-mechanical devulcanization process. In these processes, traditional rubber processing instruments, such as open mills and twin screw extruders, subject scrap rubber to shear and heat to achieve a partial devulcanization. U.S. Pat. No. 7,342,052 discloses a thermo-mechanical method of devulcanizing scrap rubber including heating the scrap rubber, agitating the scrap rubber in a thermo-kinetic mixer, and adding an oil to the scrap rubber as it is agitated. The thermo-kinetic mixer contemplated by the patent is a double boiler vessel including a mixing chamber having a rotor to apply shear stresses to the scrap rubber.

U.S. Pat. Nos. 2,461,192 and 6,632,918 each disclose a thermo-mechanical method of devulcanizing scrap rubber including heating the scrap rubber to a temperature within a desired range and applying shear stresses to the heated scrap rubber while subjecting the rubber to increased pressures. U.S. Pat. No. 2,461,192 contemplates use of a Banbury mixer to apply the shear stresses to the scrap rubber, and U.S. Pat. No. 6,632,918 contemplates using a twin-screw extruder to apply the shear stresses to the scrap rubber.

SUMMARY OF THE INVENTION

One or more embodiments of the present invention provide a process for devulcanizing EPDM rubber comprising the step of introducing sulfur-cured EPDM to an extruder, introducing from about 0.5 to about 20 wt % scavenging agent, based upon the total weight of the EPDM and scavenging agent, and mixing and masticating the EPDM at a temperature sufficient to at least partially devulcanize the sulfur-cured EPDM.

DETAILED DESCRIPTION OF ILLUSTRATIVE EMBODIMENTS

Figure 1:
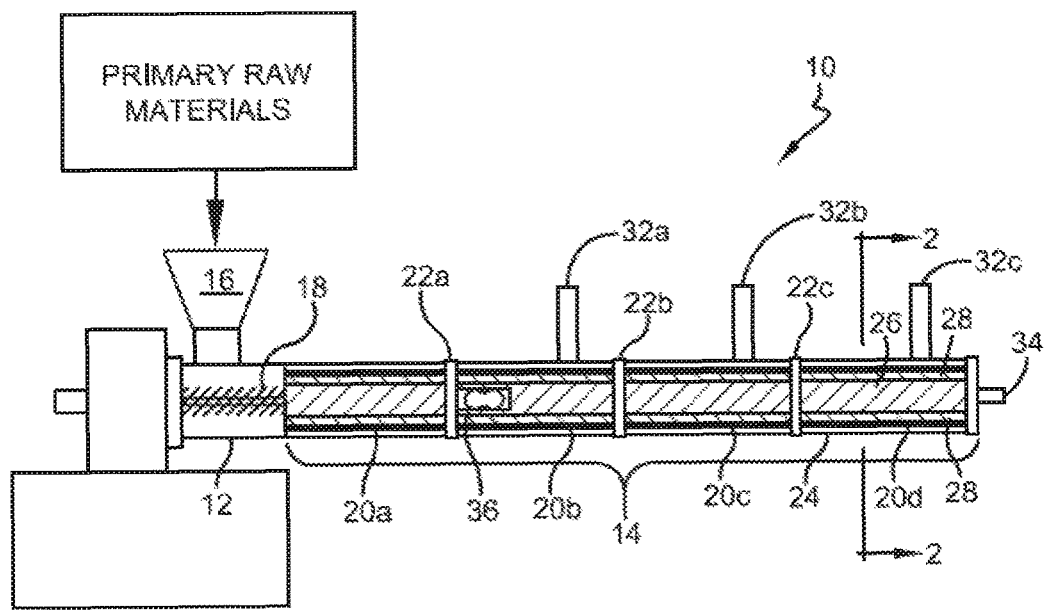
FIG. 1 is a general schematic of a planetary extruder for use in accordance with this invention.

Embodiments of the invention are based, at least in part, on the discovery of a devulcanization process for sulfur-cured rubber that includes thermo-mechanical treatment of the sulfur-cured rubber while removing and/or scavenging sulfur or sulfur-bearing species from the process. Thus, while the prior art may contemplate thermo-mechanical devulcanization of sulfur-cured rubber, the prior art does not appreciate the deleterious effect that sulfur and sulfur-bearing species can have on the process. In particular, it has been found that sulfur and/or sulfur-bearing species can degrade the equipment effecting the thermo-mechanical devulcanization and thereby deleteriously impact the process. For example, it has been observed that metal components of the extruder, such as the screws or elements of a twin-screw extruder or spindles of a planetary extruder, lose mass and diameter at unexpectedly high rates during the devulcanization of sulfur-cured rubber. It has unexpectedly been found that removal or scavenging of sulfur or sulfur-bearing species has an appreciable impact on the success of these devulcanization techniques. In lieu of, or in addition to, removal and/or scavenging the sulfur or sulfur-bearing species, the use of degradation-resistant metals for the screws, spindles, and other components of the extruder could also alleviate the problems.

Sulfur-cured Rubber Composition

In one or more embodiments, the material treated and ultimately reclaimed according to this invention includes sulfur-cured olefinic rubber. In one or more embodiments, this olefinic rubber is contained within a scrap rubber composition that can be recycled according to this invention.

In one or more embodiments, the material treated according to embodiments of this invention includes cured olefinic rubber contained within a scrap rubber composition that may also include other constituents such as fillers, oils, antioxidants, resins, stearic acid, tackifiers, various sulfur-bearing compounds, accelerators, and sundry other rubber additives that may be employed in the preparation of rubber products, such as EPDM roofing membranes. In these or other embodiments, the scrap rubber composition may include reinforcing fabric materials such as polyesters, and the like. Thus, while it is believed that the process of this invention specifically acts on and devulcanizes the cured olefinic rubber, the material being treated and processed according to embodiments of this invention includes a scrap rubber composition.

In one or more embodiments, the scrap rubber composition includes from about 5 to about 50 wt. %, in other embodiments from about 15 to about 40 wt. %, in other embodiments from about 20 to about 40 wt. %, and in other embodiments from about 25 to about 30 wt. % cured olefinic rubber based on the entire weight of the scrap rubber composition.

In one or more embodiments, the scrap rubber composition may also include filler materials such as carbon black and/or one or more mineral fillers. In one or more embodiments, the scrap rubber composition treated according to embodiments of the present invention may include from 15 to 55 wt. %, in other embodiments from about 20 to about 50 wt. %, in other embodiments from about 30 to about 45 wt. %, and in other embodiments from about 35 to about 40 wt. % carbon black based on the entire weight of the scrap rubber composition.

In these or other embodiments, the scrap rubber composition may include from 10 to 40 wt. %, in other embodiments from 15 to 30 wt. %, and in other embodiments from 18 to 25 wt. % oil or other extenders based upon the entire weight of the scrap rubber composition.

In these or other embodiments, the scrap rubber composition may include from 3 to 20 wt. %, in other embodiments from 5 to 15 wt. %, and in other embodiments from 6 to 12 wt. % mineral filler based upon the entire weight of the scrap rubber composition.

As those skilled in the art appreciate, olefinic rubber includes polymers that are curable and have sufficient amorphous character to yield cured products demonstrating one or more elastomeric properties. For example, olefinic rubbers include copolymers of ethylene with one or more alpha-olefin comonomers and optionally dienes. In particular embodiments, the olefinic rubber is copolymer of ethylene, propylene, and one or more diene monomers. As known in the art, these polymers may be referred to as EPDM. The term EPDM is used in the sense of its definition as found in ASTM-D-1418-94 and is intended to mean a terpolymer of ethylene, propylene and a diene monomer with the residual unsaturation portion of the diene in the side chain. Illustrative methods for preparing such terpolymers are found in U.S. Pat. No. 3,280,082, the disclosure of which is incorporated herein by reference.

As described above, the olefinic rubber component (e.g. EPDM) of the scrap rubber composition is sulfur-cured. In particular embodiments, the cured olefinic rubber component, which may also be referred to as the crosslinked or vulcanized rubber component, is sulfur cured. In one or more embodiments, sulfur cured olefinic rubber includes sulfur-containing crosslinks between polymer molecules. In one or more embodiments, the sulfur-containing crosslinks may form an infinite network or gel within the scrap rubber composition.

In one or more embodiments, the cured olefinic rubber component (e.g., cured EPDM), prior to treatment according to the present invention, is cured to a degree where less than 10 wt. %, in other embodiments less than 5 wt. %, in other embodiments less than 2 wt. %, in other embodiments less than 1 wt. %, and in other embodiments less than 0.1 wt. % of the rubber component is soluble in chloroform at 65° C.

The source of the scrap rubber composition may vary. In particular embodiments, the scrap rubber composition is obtained from existing membrane products, such as EPDM roofing membranes or geomembranes, that have been removed from service. For example, they may include membranes removed from an existing roof or geomembranes removed from existing water containment sources or the like. In other embodiments, the cured EPDM is obtained from manufacturing scrap, such as from the manufacturing of EPDM membranes including roofing membranes and geomembranes. In one or more embodiments, the scrap rubber composition need not derive from membrane and may be obtained from roofing flashing products, walkway pads, and the like.

Treatment of Scrap Rubber Composition

In one or more embodiments, the scrap rubber composition is treated within an extruder that is capable of imparting sufficient mechanical energy and/or thermal energy on the sulfur-cured rubber to effect devulcanization or partial devulcanization of the sulfur-cured rubber. In one or more embodiments, the extruder is a twin-screw extruder. In other embodiments, the extruder is a ring extruder. In yet other embodiments, the extruder is a planetary roller extruder, which may simply be referred to as a planetary extruder or as an extruder. In still other embodiments, the extruder is a continuous mixer such as a Farrel Continuous Mixer (FCM).

As is known in the art, extrusion processes may be generally segmented into different phases as the materials being processed within the extruder are conveyed within the extruder. In one or more embodiments, and by way of example, the process may include a first phase where the sulfur-cured process is heated while undergoing initial mastication. In certain embodiments, the sulfur-cured composition is ground and generally homogeneous on a macroscale. The first phase may take place within a first barrel or first series of barrels of the extruder.

The second phase generally includes intense heating and/or mastication of the sulfur-cured rubber to effect most or all of the devulcanization of the rubber. Within the second phase, the rubber may undergo back mixing and experience high pressures within the extruder. In one or more embodiments, the second phase may take place in one or more barrels of the extruder that are downstream of the first-phase barrels.

The third and final phase generally includes cooling and conveying of the processed materials to a location, such as a die, where the processed materials are finished. In one or more embodiments, the third phase may take place in one or more barrels of the extruder that are downstream of the second-phase barrels.

Figure 2:
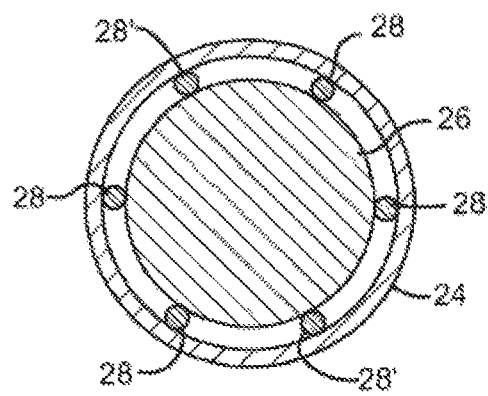
FIG. 2 is a cross sectional view taken along the line 2-2 in FIG. 1.
Figure 3:
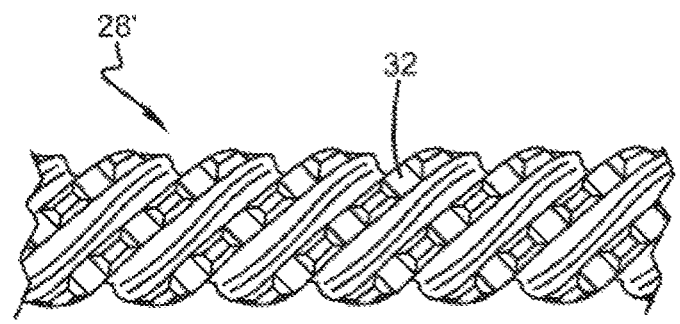
FIG. 3 is a side view of a double transversal spindle.

An exemplary process for the devulcanization of sulfur-cured rubber can be explained with reference to FIGS. 1 and 2, which show a planetary roller extruder 10, which may simply be referred to as planetary extruder 10. The drawings serve to facilitate explanation of the extruder and its general operation, particularly as it relates to the present process, but, in actual practice, the shape and size of extruder 10 might be substantially different from that illustrated and yet still be within the scope of the invention.

Planetary roller extruder 10 includes a feeding section 12 and a compounding section 14. The scrap rubber composition is added into the feed throat 16 and metered onto the conveying screw 18 of the filling section 12. The screw 18 conveys the scrap rubber composition into the compounding section 14. The compounding section 14 includes four planetary roller barrel sections 20a, 20b, 20c and 20d (collectively referenced by the numeral 20 herein), which may optionally be separated by rings 22a, 22b and 22c (collectively referenced by the numeral 22 herein). In certain embodiments, each roller barrel section 20 includes a 45° helical toothed cylinder 24, a 45° helical toothed main spindle 26, and a plurality of 45° helical toothed planetary spindles 28. In some embodiments, the helical gearing can have any suitable angle, for example, an angle of 10 to 60°. In other embodiments, an angle of greater than 20° may be useful.

Conventional planetary extruders contain at least 3 and can contain up to 24 planetary spindles depending on the diameter of the cylinder and process design. Of course, one of skill in the art would realize that a greater number of planetary spindles could be used depending on the specific dimensions and construction of the extruder. In one embodiment of the invention, the planetary roller extruder 10 has from 3 to 24 planetary spindles 28, in other embodiments, from 4 to 16 planetary spindles 28, and, in yet other embodiments, from 4 to 10 planetary spindles 28. In one or more embodiments, each barrel section may be equipped with a different number of planetary spindles 28 to achieve a desired effect within each barrel.

The rotation of the main spindle 26 can cause the planetary spindles 28 to be set in rotational movement, as a result of the helical gearing of the main spindle 26 interacting with the helical gearing of the planetary spindles 28. The planetary spindles 28 may also mesh with the internal gearing of the cylinder section 24. The helical gearing of the main spindle 26, the planetary spindles 28, and the cylinder section 24 may be employed to convey the scrap rubber composition in the direction of the discharge orifice 34.

In accordance with certain aspects of the present invention, at least one of the roller barrel sections 20 includes a double transversal planetary spindle 28. The present invention is not limited to the use of double transversal planetary spindles. Other spindle configurations that provide the desired levels of mixing can also be used.

The maximum number of planetary spindles 28 can be a function of the diameter of the main spindle 26 and the helical toothed cylinder 24. The planetary spindles 28 can exhibit many different tooth geometries, e.g., full helical flights, double transversal helical flights (also known as back-cut spindles), or zoned helical flights, etc. The number of planetary spindles chosen and their geometries (e.g., open vs. full flight) can be manipulated in such a way as to influence the dynamic discharging effect of each roller barrel section 20 and the discharging differential between sections. Additionally, the gap between the ring 22 and the main spindle 26 can be changed to vary the dynamic discharging effect of each barrel section 20 and the discharging differential between the barrel sections 20.

Removal of Sulfur and Sulfur-Bearing Species

In one or more embodiments, sulfur and sulfur-bearing species are removed from the extruder as volatiles. In these or other embodiments, water is removed from the extruder in the form of volatiles (i.e. steam). In one or more embodiments, the volatiles are removed from the extruder through a vent within the extruder. In one or more embodiments, a vacuum pump (not specifically shown) can be used to improve the volatilization and removal of volatiles.

In one or more embodiments, one or more vents are located in the second-phase of the extruder where the rubber undergoes intense heating and/or mastication and most or all of the devulcanization of the rubber is believed to take place. For example, and as shown in FIG. 1, volatile compounds present within extruder 10, or at least a portion thereof, are removed through an outlet 18, which may include a vent section 32a within the extruder, located within the second barrel 20b. In combination therewith, or in lieu of vent section 32a, vent section 32b may be positioned at third barrel 20c. In one or more embodiments, a vent 32c (optionally with vacuum) can also be placed at the fourth barrel 20d.

Scavenging of Sulfur and Sulfur-Bearing Species

In one or more embodiments, sulfur and sulfur-bearing species are scavenged and/or neutralized by the addition of a scavenging agent to the extruder. In addition to, or in lieu of, the desiccant may be added to the extruder in order to scavenge water and thereby inhibit any degradation reactions wherein sulfur and/or sulfur-bearing species may react or interact with water to effect degradation of the metal within the extruder. For purposes of this specification, the scavenging agent may also be referred to as a neutralizing agent.

In one or more embodiments, alkali metal and/or alkaline earth metal oxides are added to the extruder. Specific examples of such oxides include, but are not limited to, calcium oxide and magnesium oxide. In other embodiments, alkali metal and/or alkaline earth metal carbonates are added to the extruder. Specific examples of such oxides include, but are not limited to, calcium carbonate, calcium-magnesium carbonate, sodium carbonate, and potassium carbonate. Other materials that could be added include hydroxides such as calcium and magnesium hydroxides.

In one or more embodiments, the amount of the scavenging agent employed (i.e. added to the extruder) in the practice of the invention may be described with respect to the rubber material to be devulcanized. In one or more embodiments, at least 0.5 wt %, in other embodiments at least 1 wt %, in other embodiments at least 1.5 wt %, in other embodiments at least 2 wt %, and in other embodiments at least 2.5 wt % scavenging agent, based upon the total weight of the scavenging agent and rubber material to be processed, is employed. In these or other embodiments, at most 20 wt %, in other embodiments at most 15 wt %, in other embodiments at most 10 wt %, in other embodiments at most 7 wt %, and in other embodiments at most 5 wt % scavenging agent, based upon the total weight of the scavenging agent and rubber material to be processed, is employed. In one or more embodiments, from about 0.5 to about 20 wt %, in other embodiments from about 1.0 to about 15 wt %, and in other embodiments from about 1.5 to about 10 wt % scavenging agent, based upon the total weight of the scavenging agent and rubber material to be processed, is employed.

In one or more embodiments, the scavenging agent and/or desiccant can be added to the extruder at a down-steam location (i.e. at a location where devulcanization is believed to primary occur). For example, the scavenging agent and/or desiccant can be added in the second-phase of the extruder where the rubber undergoes intense heating and/or mastication and most or all of the devulcanization of the rubber is believed to take place. In other embodiments, the scavenging agent is added together with the rubber material to be processed (i.e. at the feed throat of the extruder).

In one or more embodiments, the scavenging agent and/or desiccant is added directly to the extruder, or it may be added to the extruder in combination with a carrier. The use of a carrier can advantageously facilitate the handling and introduction of the scavenging agent and/or desiccant into the extruder. For example, the carrier can facilitate dispersion and mixing of the scavenging agent and/or desiccant once introduced to the extruder. In one or more embodiments, the carrier may include an oil, such as an aliphatic oil. In other embodiments, the carrier can include a polymer such as a low-molecular weight (i.e. high melt flow) polyolefin or unvulcanized or low Mooney rubber (e.g. EPR). The scavenging agent and/or desiccant can be dispersed in the carrier and then fed to the extruder. For example, the scavenging agent and/or desiccant can be combined with the carrier within a side feeder or single screw extruder and then fed into one of the down-stream barrels (e.g. barrel 2 or 3) of the extruder.

In one or more embodiments, the oil includes a processing oil of the type that is commonly used in the rubber industry. Examples of processing oils include paraffinic oils, aromatic oils, naphthenic oils, vegetable oils other than castor oils, and low PCA oils including MES, TDAE, SRAE, heavy naphthenic oils, and black oils. A particular processing oil is Sunpar 2280, from Sunoco, Inc.

In other embodiments, the oil is a heat transfer oil. In particular embodiments, the heat transfer oils have a processing temperature (i.e. they will not be appreciably degraded) at temperatures of at least 200° C., in other embodiments at least 230° C., in other embodiments at least 250° C., in other embodiments at least 270° C., in other embodiments at least 285° C., in other embodiments at least 295° C., in other embodiments at least 300° C., in other embodiments at least 310° C., in other embodiments at least 320° C., in other embodiments at least 330° C., in other embodiments at least 340° C., and in other embodiments 350° C. In particular embodiments, the heat transfer oils have a viscosity of from 20 to 40 centistokes (cSt) at 40° C., in other embodiments from 25 to 35 cSt, in other embodiments from 27 to 33, and, in other embodiments from 29 to 31 cSt. In particular embodiments, the heat transfer oils have a flash point temperature greater than 180° C., in other embodiments greater than 190° C., in other embodiments greater than 200° C., and, in other embodiments at least 210° C. In particular embodiments, the heat transfer oils have a boiling point greater than 200° C., in other embodiments at least 230° C., in other embodiments at least 250° C., in other embodiments at least 275° C., in other embodiments at least 300° C., in other embodiments at least 310° C., and in other embodiments at least 315° C. A particular heat transfer oil is Transcal N™ from BP (formerly British Petroleum). Transcal N has a viscosity of 30.4 cSt at 40° C., a flash point temperature of 208° C., and a boiling point of 316° C.

Process Characteristics

The skilled person will be able to practice the present invention and select appropriate temperature and residence time within the extruder to effect devulcanization of the sulfur-cured rubber.

Industrial Applicability

The rubber sheet material, as described herein, can be used to cover a roof. As the sheet is unrolled over the roof substructure in an otherwise conventional fashion, the seams of adjacent sheet layers are overlapped. The width of the seam can vary depending on the requirements specified by the architect, building contractor or roofing contractor and thus, do not constitute a limitation of the present invention.

The overlapping edges of the roofing membranes can be cleaned with soap and water or the appropriate solvent to remove any grease, oil or other contaminants that could interfere with providing adequate adhesion, and/or may be solvent cleaned as desired, to enhance bond formation and increase seam adhesion peel strength. Typical solvents used for cleaning the overlapped edges of the roofing membrane include hexane, heptane, or toluene, however, solvent cleaning is generally not required. Where a bonding adhesive is used, one example suitable for use with this invention is BA-2004, a neoprene-based adhesive commercially available from Firestone Building Products Company and where a lap-splice seam adhesive is used, one example suitable for use with this invention is Firestone's SA-1065, a commercially available butyl-based lap-splice adhesive. Application of the adhesive can be facilitated by spray, brush, swab or other means known in the art.

Membranes prepared according to the present invention advantageously and unexpectedly meet performance standards ASTM D 4637-03 and/or ASTM D 1418-85 while including up to 3 wt % reclaimed EPDM rubber, in other embodiments up to 5 wt % reclaimed EPDM rubber, in other embodiments10 wt % reclaimed EPDM rubber, in other embodiments up to 12 wt % reclaimed EPDM rubber, in other embodiments up to 15 wt % reclaimed EPDM rubber, in other embodiments up to 20 wt % reclaimed EPDM rubber, in other embodiments up to 30 wt % reclaimed EPDM rubber, in other embodiments up to 40 wt % reclaimed EPDM rubber, and in other embodiments up to 50 wt % reclaimed EPDM rubber, based upon the total weight of the rubber component of the EPDM membrane.

One of the unexpected properties of the membranes according to one or more embodiments of the present invention is their ability to retain physical properties after heat aging. Specifically, it has unexpectedly been found that, after about 28 days of aging at about 116° C., the tensile strength has a percent retention of at least about 90 percent, advantageously at least about 95 percent, and even more advantageously above about 100 percent. In one or more embodiments, it has been found that the die C tear resistance, after similar aging, has a percent retention of at least about 90 percent, advantageously at least about 95 percent, and even more advantageously at least about 100 percent. In one or more embodiments it has been found that the elongation, after similar aging, has a percent retention of at least about 70 percent, advantageously at least about 75 percent, and even more advantageously above about 80 percent.

Various modifications and alterations that do not depart from the scope and spirit of this invention will become apparent to those skilled in the art. This invention is not to be duly limited to the illustrative embodiments set forth herein.

What is claimed is:

1. A process for devulcanizing EPDM rubber comprising the steps of:
   introducing sulfur-cured EPDM to an extruder;
   introducing an oxide or a carbonate of an alkali metal or alkaline earth metal to the extruder, wherein the oxide or a carbonate of an alkali metal or alkaline earth metal is introduced so as to protect against degradation of the extruder; and
   mixing and masticating the EPDM within the extruder in the presence of the oxide or a carbonate of an alkali metal or alkaline earth metal at a temperature sufficient to at least partially devulcanize the sulfur-cured EPDM.

2. The process of claim 1, further comprising the step of removing volatiles from the extruder.

3. The process of claim 2, where the volatiles are removed from a vent.

4. The process of claim 1, where said step of introducing includes introducing from about 0.5 to about 20 wt % of the oxide or a carbonate of an alkali metal or alkaline earth metal based upon the total weight of the EPDM and the oxide or a carbonate of an alkali metal or alkaline earth metal.

5. The process of claim 1, where said step of introducing includes introducing from about 1.0 to about 10 wt % of the oxide or a carbonate of an alkali metal or alkaline earth metal based upon the total weight of the EPDM and the oxide or a carbonate of an alkali metal or alkaline earth metal.

6. The process of claim 1, where said step of introducing includes introducing from about 1.5 to about 5 wt % of the oxide or a carbonate of an alkali metal or alkaline earth metal based upon the total weight of the EPDM and the oxide or a carbonate of an alkali metal or alkaline earth metal.

* * * * *